US00RE45933E

(19) United States
(12) Reissued Patent
Ediger et al.

(10) Patent Number: US RE45,933 E
(45) Date of Reissued Patent: Mar. 22, 2016

(54) STEAM CLEANER

(71) Applicants: Glen W. Ediger, North Newton, KS (US); Gary P. Israel, Andover, KS (US)

(72) Inventors: Glen W. Ediger, North Newton, KS (US); Gary P. Israel, Andover, KS (US)

(73) Assignee: VORNADO AIR LLC, Andover, KS (US)

(21) Appl. No.: 29/421,264

(22) Filed: Feb. 5, 2013

Related U.S. Patent Documents

Reissue of:
(64) Patent No.: Des. 657,100
Issued: Apr. 3, 2012
Appl. No.: 29/362,670
Filed: May 28, 2010

(51) LOC (10) Cl. ..... 31-02
(52) U.S. Cl.
USPC ..... D21/667
(58) Field of Classification Search
None
See application file for complete search history.

(56) References Cited

U.S. PATENT DOCUMENTS

| | | | | | |
|---|---|---|---|---|---|
| D399,617 | S | * | 10/1998 | Fujita | D32/21 |
| D417,046 | S | * | 11/1999 | Tsuruha et al. | D32/21 |
| D430,711 | S | * | 9/2000 | Piret | D32/21 |
| D445,973 | S | * | 7/2001 | Chen | D32/21 |
| D452,594 | S | * | 12/2001 | Rosa | D32/21 |
| 6,397,502 | B1 | * | 6/2002 | Chen | 38/77.8 |
| 6,533,871 | B2 | * | 3/2003 | Zahuranec et al. | 134/21 |
| D473,025 | S | * | 4/2003 | Simmons | D32/17 |
| D486,279 | S | * | 2/2004 | Chen | D32/17 |
| D488,598 | S | * | 4/2004 | Wakasa | D32/21 |
| D489,499 | S | * | 5/2004 | Buzzi | D32/17 |
| D493,586 | S | * | 7/2004 | Choi | D32/21 |
| D495,584 | S | * | 9/2004 | Su | D8/347 |
| D499,517 | S | * | 12/2004 | Chen | D32/17 |
| 6,865,773 | B2 | * | 3/2005 | Tsen | 15/323 |
| 6,968,593 | B1 | * | 11/2005 | Lenkiewicz et al. | 15/320 |
| D519,249 | S | * | 4/2006 | Liu et al. | D32/21 |
| D520,196 | S | * | 5/2006 | Liu | D32/21 |
| D522,192 | S | * | 5/2006 | Liu et al. | D32/21 |
| D523,597 | S | * | 6/2006 | Lee | D32/17 |
| D530,468 | S | * | 10/2006 | Lee | D32/21 |
| D530,869 | S | * | 10/2006 | Chen | D32/21 |
| D531,768 | S | * | 11/2006 | Lee | D32/21 |
| D537,215 | S | * | 2/2007 | Foersterling | D32/9 |
| D552,810 | S | * | 10/2007 | Shin | D32/21 |
| D553,811 | S | * | 10/2007 | Shin | D32/21 |
| D569,062 | S | * | 5/2008 | Nardone et al. | D32/21 |
| 7,421,759 | B2 | * | 9/2008 | Michael et al. | 15/320 |
| D580,608 | S | * | 11/2008 | Santiago et al. | D32/21 |
| D599,511 | S | * | 9/2009 | Massip et al. | D32/17 |
| D607,620 | S | * | 1/2010 | Massip et al. | D32/17 |
| D623,365 | S | * | 9/2010 | Ediger et al. | D32/17 |
| D623,366 | S | * | 9/2010 | Ediger et al. | D32/17 |

(Continued)

*Primary Examiner* — Phillip S Hyder
(74) *Attorney, Agent, or Firm* — David H. Milligan

(57) CLAIM

The ornamental design for a [handheld dual chamber] steam cleaner, as shown and described.

DESCRIPTION

FIG. 1 is a front perspective view of [handheld dual chamber] steam cleaner showing our new design;
FIG. 2 is a rear perspective view thereof;
FIG. 3 is a front elevation view thereof;
FIG. 4 is a rear elevation view thereof:
FIG. 5 is a left side elevation view thereof;
FIG. 6 is a right side elevation view thereof;
FIG. 7 is a bottom plan view thereof; and,
FIG. 8 is a top plan view thereof.
In the drawings, the broken lines in FIGS. 1-8, depict portions of the design that form no part of the claim.

1 Claim, 8 Drawing Sheets

Figure 1:
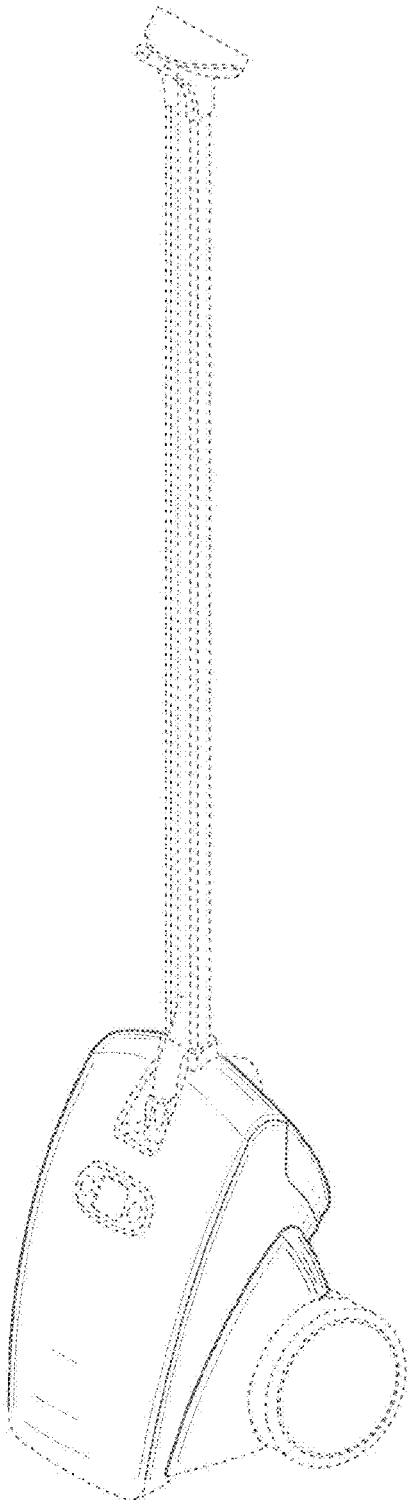
Figure 2:
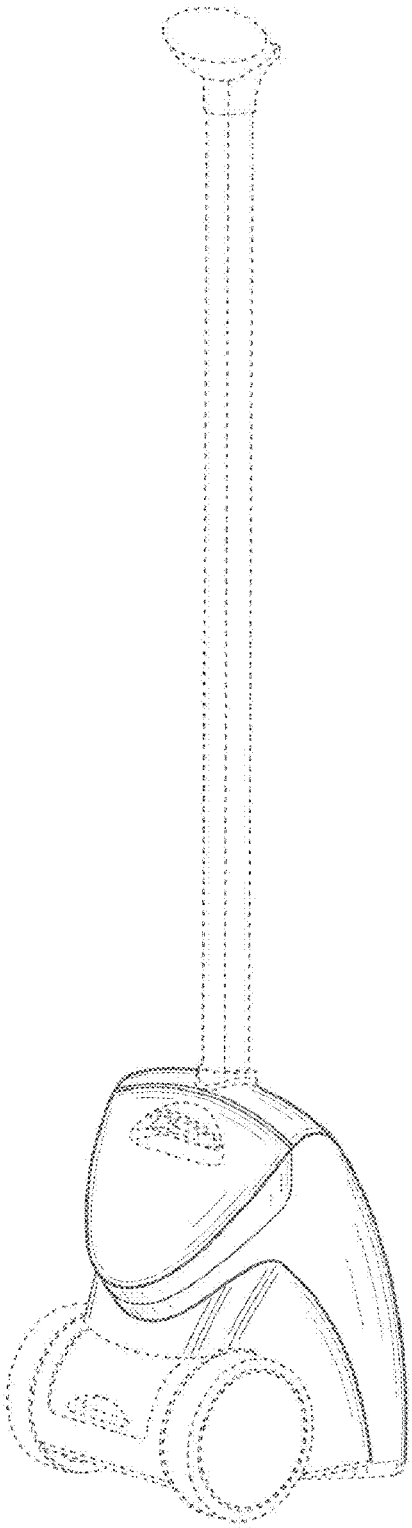
Figure 3:
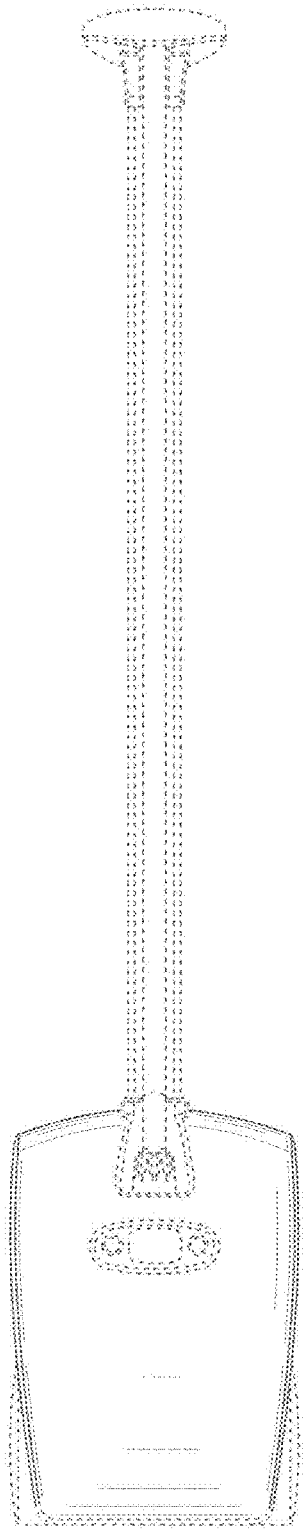
Figure 4:
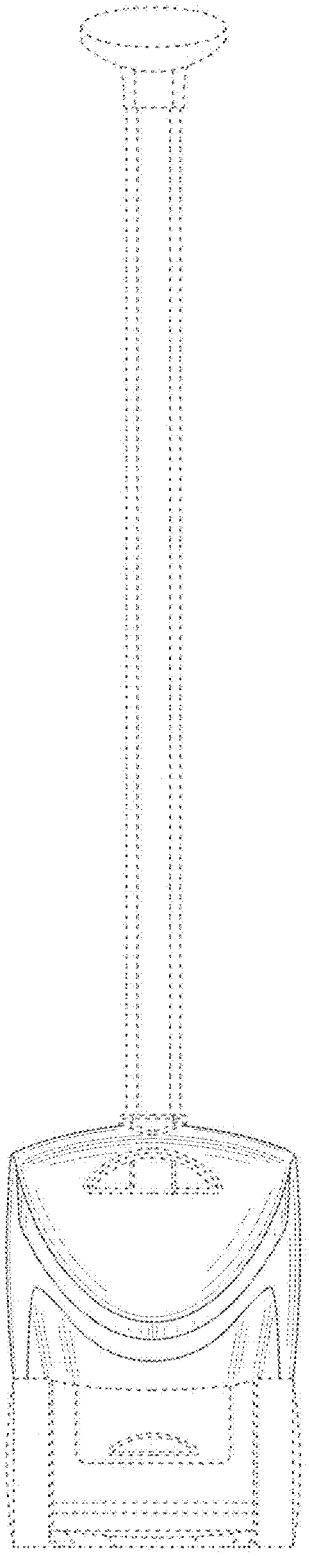
Figure 5:
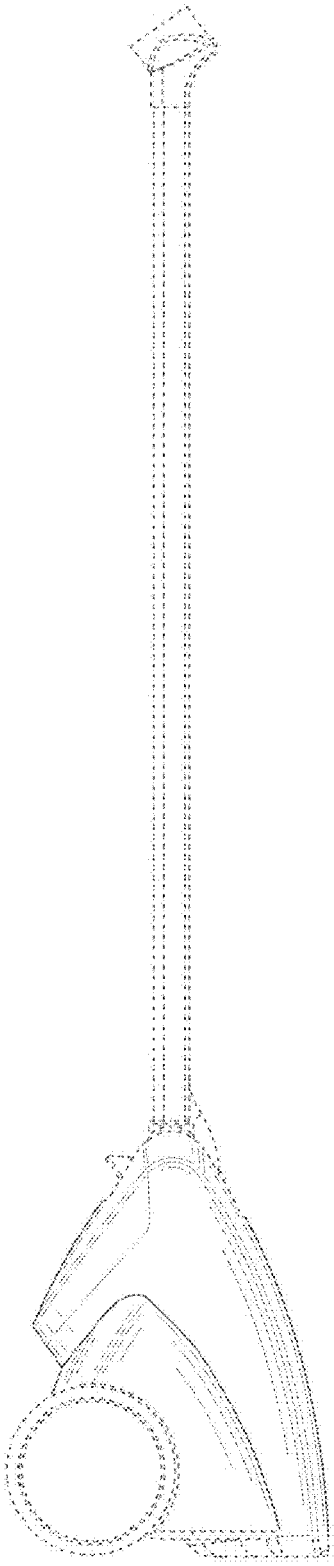
Figure 6:
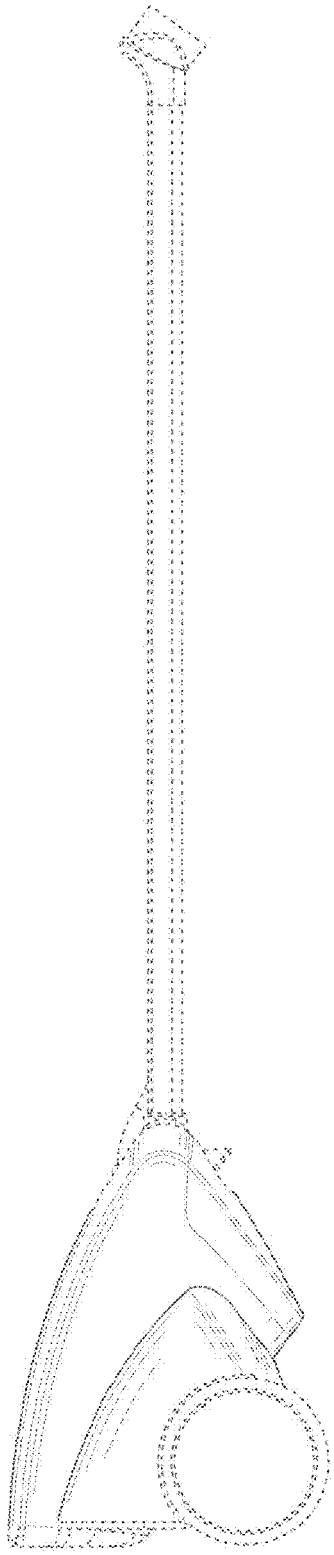
Figure 7:
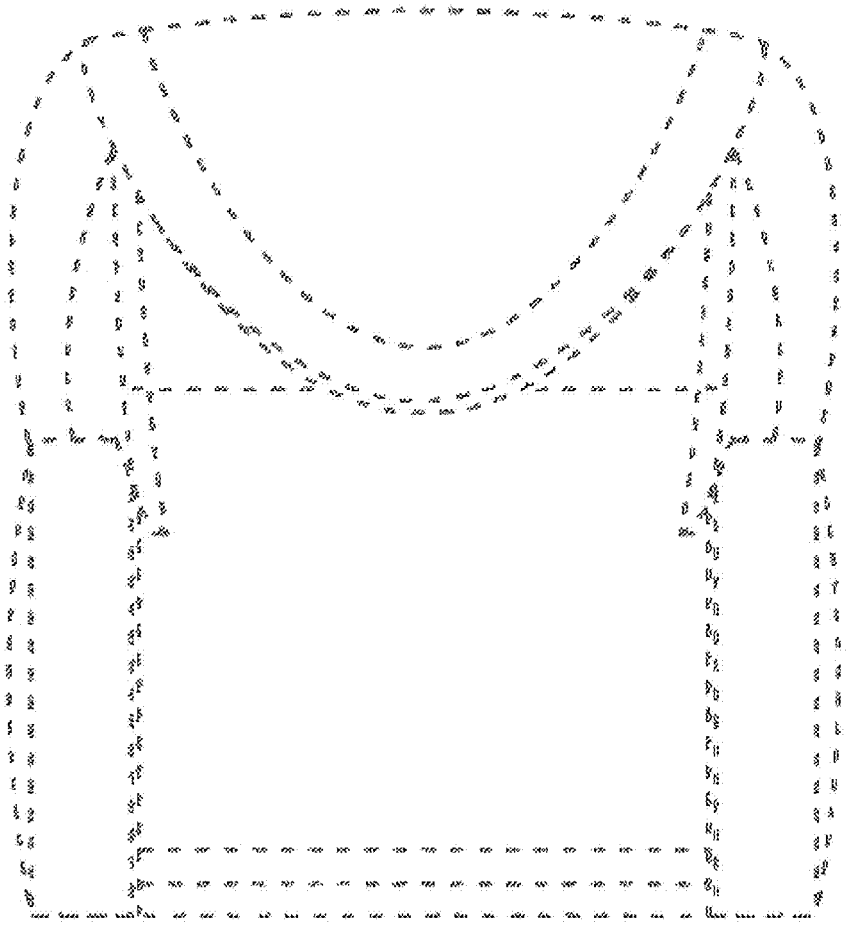
Figure 8:
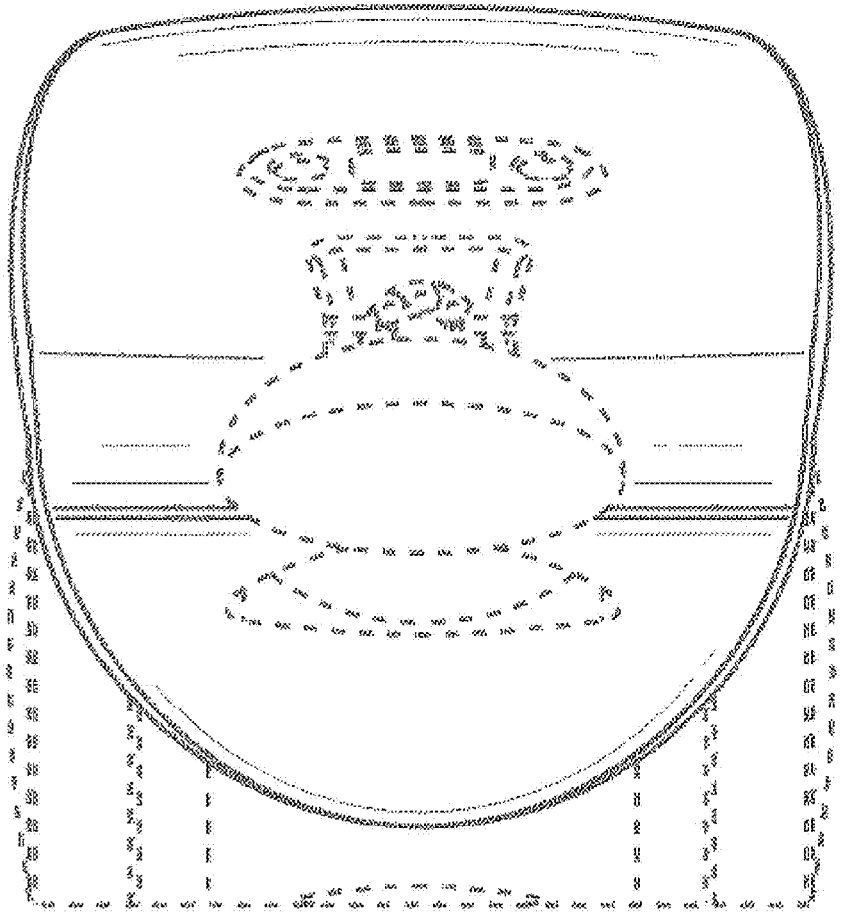

Matter enclosed in heavy brackets [ ] appears in the original patent but forms no part of this reissue; matter printed in italics indicates the additions made by reissue.

(56) References Cited

U.S. PATENT DOCUMENTS

D627,940 S * 11/2010 Smith ..... D32/17
2002/0178532 A1* 12/2002 Amoretti ..... 15/327.2
2003/0208872 A1* 11/2003 Tsen ..... 15/321
2004/0144140 A1* 7/2004 Lee ..... 68/222

* cited by examiner